(12) United States Patent
Kim et al.

(10) Patent No.: US 9,616,761 B2
(45) Date of Patent: Apr. 11, 2017

(54) IN-CABLE-CONTROL BOX FOR CHARGING OF ELECTRIC VEHICLE AND SCHEDULED CHARGING METHOD THEREOF

(71) Applicant: KYUNGSHIN CO., LTD., Incheon (KR)

(72) Inventors: Nam Han Kim, Incheon (KR); Dong Gook Shin, Incheon (KR)

(73) Assignee: Kyungshin Co., Ltd., Incheon (KR)

( * ) Notice: Subject to any disclaimer, the term of this patent is extended or adjusted under 35 U.S.C. 154(b) by 307 days.

(21) Appl. No.: 14/477,714

(22) Filed: Sep. 4, 2014

(65) Prior Publication Data
US 2015/0329000 A1 Nov. 19, 2015

(30) Foreign Application Priority Data
May 15, 2014 (KR) .................. 10-2014-0058644

(51) Int. Cl.
*H02J 7/00* (2006.01)
*B60L 11/18* (2006.01)
*B60L 3/00* (2006.01)
*B60L 3/04* (2006.01)
(Continued)

(52) U.S. Cl.
CPC ............. *B60L 11/1818* (2013.01); *B60L 3/00* (2013.01); *B60L 3/04* (2013.01); *B60L 11/1809* (2013.01); *B60L 11/1824* (2013.01); *B60L 11/1838* (2013.01); *H01M 10/44* (2013.01); *H01M 10/488* (2013.01); *H02J 7/0047* (2013.01); *B60L 2230/12* (2013.01); *B60L 2230/16* (2013.01); *B60L 2240/80* (2013.01); *B60L 2250/10* (2013.01); *B60L 2250/14* (2013.01); *B60L 2250/16* (2013.01); *H01M 2220/20* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC .................................................. B60L 11/1818
USPC ......................................................... 320/109
See application file for complete search history.

(56) References Cited

U.S. PATENT DOCUMENTS

| | | | | |
|---|---|---|---|---|
| 2011/0074351 A1* | 3/2011 | Bianco | ............... | B60L 11/1816 320/109 |
| 2012/0309455 A1* | 12/2012 | Klose | ................. | B60L 11/1838 455/557 |

FOREIGN PATENT DOCUMENTS

| | | |
|---|---|---|
| KR | 10-2011-0043731 | 3/2011 |
| KR | 10-2012-0012430 A | 2/2012 |
| KR | 10-2012-0099869 A | 9/2012 |

* cited by examiner

*Primary Examiner* — Edward Tso
*Assistant Examiner* — Ahmed Omar
(74) *Attorney, Agent, or Firm* — Casari and McKenna LLP

(57) ABSTRACT

Disclosed are an in-cable control box for charging an electric vehicle and a scheduled charging method thereof. The in-cable control box includes an input unit that receives selection of a charging mode and settings according to the charging mode; a display unit that displays a charging state; a warning unit that outputs a warning sound corresponding to change in the charging state; a power supply that supplies electric power to an on-board charger of an electric vehicle; and a controller that regulates electric power from the power supply to the on-board charger according to the charging mode and settings received through the input unit, controls the display unit to display a charging state, and controls the warning unit to output a warning sound corresponding to change in the charging state.

5 Claims, 3 Drawing Sheets

(51) Int. Cl.
*H01M 10/44* (2006.01)
*H01M 10/48* (2006.01)

IN-CABLE-CONTROL BOX FOR CHARGING OF ELECTRIC VEHICLE AND SCHEDULED CHARGING METHOD THEREOF

CROSS REFERENCE TO RELATED APPLICATIONS

This application claims the benefit of Korean Application No. 10-2014-0069644, filed on May 15, 2014. The content of this application is hereby incorporated by reference in its entirety.

BACKGROUND

1. Technical Field

The present invention relates to a device for charging an electric vehicle, and more particularly, to an in-cable control box for charging an electric vehicle not in a charging station and a scheduled charging method thereof.

2. Description of the Related Art

As environmental regulations have recently been strengthened, demand for environment-friendly electric vehicles has been increasing. However, an electric vehicle driven by a motor has a disadvantage in that the maximum mileage is shorter than that of an existing vehicle employing an internal combustion engine. In addition, since increase in battery capacity of the electric vehicle has a problem in terms of efficiency due to increase in the weight of the vehicle, frequent charging is performed instead of increasing the battery capacity. Therefore, there is a need for expansive establishment of charging infrastructure before broad distribution of electric vehicles.

An electric vehicle charging system can be classified according to charging methods, connection methods, and communication methods. The charging methods include a conductive charging method, an inductive charging method, and a battery swapping method. An electric connection device includes a connector corresponding to a lubricator and an inlet formed in an electric vehicle and corresponding to a gas inlet, and is classified into a single-phase or three-phase alternating current (AC) type, a direct current (DC) type, and a combo type for both AC and DC according to types of electric power. The communication methods between the charging system and the electric vehicle include a controller area network (CAN) method used in Japan and a power line communication (PLC) method preferred in the U.S. and Europe.

Among the charging methods of the electric vehicle, the conductive charging method is realized through electric connection and employs an AC charging stand or a DC charging device. The AC charging stand is not a charging device but a power supply that supplies AC power for charging, and actual charging is performed by an on-board charger in the electric vehicle. Such an AC charging stand inputs and outputs AC power having a commercial frequency.

As the AC charging stand, there are a self-standing charging stand and a portable in-cable control box (ICCB). The self-standing charging stand is very expensive as compared with the ICCB. Thus, the self-standing charging stand is generally used in a charging station and the ICCB is generally employed for family use.

As described above, the ICCB refers to a portable power supply that secures safety required upon charging of the electric vehicle with household electric power, and corresponds to a slow charging method where 7-8 hours are taken until charging is completed.

On the other hand, information about charging states of a conventional ICCB can be indicated in such a manner that a power light emitting diode (LED) flickers upon connection to an AC power source, a charging LED flickers during charging, and failure LED flickers when failure such as overcurrent, current leakage, and the like happens during charging. That is, a driver has no choice but to recognize a charging state indicated through just three color LEDs, and it is hard for the driver to recognize the current charging state in detail. Further, it is difficult and inconvenient for a driver to immediately recognize change in the charging state, if the driver does not look at the ICCB. In particular, when the failure LED flickers, there is no way to know what is wrong with the ICCB, and it is difficult and inconvenient for a driver to quickly cope with flickering of the failure LED.

Additionally, in the slow charging method, it is advantageous to use inexpensive midnight electric power or dump power. However, a conventional ICCB starts charging only in response to connection between the AC power and the connector and terminates charging only when the battery is fully charged. Therefore, when a driver performs charging at a specific time or to perform partial charging, there is inconvenience in that charging must be manually performed.

Korean Patent Publication No. 10-2011-0043731 (Apr. 27, 2011) discloses charging of an electric vehicle with an ICCB.

BRIEF SUMMARY

The present invention has been conceived to solve such problems in the art and it is one aspect of the present invention to provide an in-cable control box for charging an electric vehicle, which provides detailed information about a charging state, indicates the detailed information to be recognized by a driver through various methods, and is capable of controlling a charging time, and a scheduled charging method thereof.

In accordance with one aspect of the present invention, an in-cable control box includes: an input unit that receives selection of a charging mode and settings according to the charging mode; a display unit that displays a charging state; a warning unit that outputs a warning sound corresponding to change in the charging state; a power supply that supplies electric power to an on-board charger of an electric vehicle; and a controller that regulates electric power from the power supply to the on-board charger according to the charging mode and settings received through the input unit, controls the display unit to display a charging state, and controls the warning unit to output a warning sound corresponding to change in the charging state.

The controller may regulate the electric power supplied from the power supply to the on-board charger according to scheduled settings when a scheduled mode is input through the input unit, and may cut off the electric power supplied from the power supply to the on-board charger when charging of the on-board charger becomes impossible before a termination time according to the scheduled settings is reached.

The in-cable control box may further include a sensing unit for sensing failure of the in-cable control box, wherein the controller cuts off the electric power supplied from the power supply to the on-board charger, controls the display unit to display the kind of failure, and controls the warning unit to output a warning sound corresponding to the kind of failure, when the sensing unit senses failure of the in-cable control box.

The in-cable control box may further include an emergency power unit for supplying emergency power to the in-cable control box, wherein the controller controls the emergency power unit to supply electric power to the in-cable control box, and controls the warning unit to output a warning sound, when supply of the electric power to the in-cable control box is stopped.

The in-cable control box may further include a communication unit for communicating with a user terminal, wherein the controller transmits information about the charging state to the user terminal through the communication unit.

The controller may regulate the electric power supplied from the power supply to the on-board charger according to the charging mode and the settings received from the user terminal, when the selection of a charging mode and the settings according to the charging mode are received from the user terminal through the communication unit.

In accordance with another aspect of the present invention, a scheduled charging method of an in-cable control box includes: by a controller, receiving a scheduled mode and settings including at least one of a charging start time, a charging termination time and a charge amount according to the scheduled mode; by the controller, checking a state of an on-board charger of an electric vehicle and determining whether charging is possible when the charging start time according to the settings is reached; and by the controller, supplying electric power to the on-board charger until the charging termination time according to the settings is reached.

The scheduled charging method may further include: displaying a charging state; and outputting a warning sound corresponding to change in the charging state.

The scheduled charging method may further include: sensing failure of the in-cable control box; and by the controller, cutting off electric power supplied to the on-board charger when the failure is sensed, displaying the kind of failure, and outputting a warning sound corresponding to the kind of failure.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, embodiments of the invention will be described in detail with reference to the accompanying drawings. It should be noted that the drawings are not to precise scale and may be exaggerated in thickness of lines or size of components for descriptive convenience and clarity only. In addition, the terms used herein are defined by taking functions of the present invention into account and can be changed according to user or operator custom or intention. Therefore, definition of the terms should be made according to the overall disclosure set forth herein.

Figure 1:
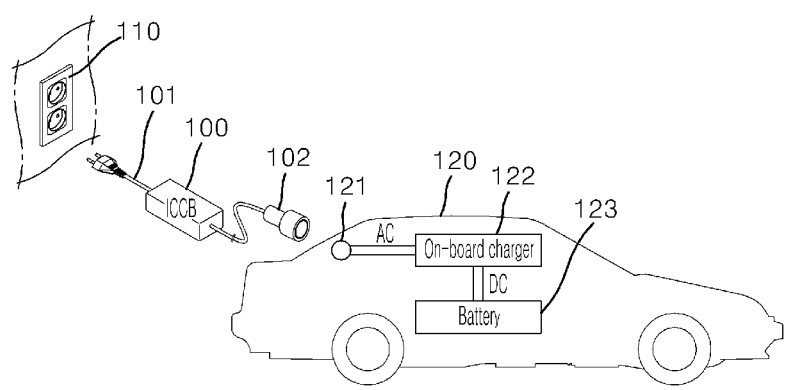
FIG. 1 is a schematic diagram of an in-cable control box for charging an electric vehicle according to one embodiment of the present invention.

FIG. 1 is a schematic diagram of an in-cable control box (ICCB) for charging an electric vehicle according to one embodiment of the present invention.

Referring to FIG. 1, according to one embodiment of the present invention, an electric vehicle 120 is charged by an ICCB 100 connected to a socket 110 on a wall or the like. The ICCB 100 includes an AC power line 101 and a connector 102, and the electric vehicle 120 includes an inlet 121, an on-board charger 122 and a battery 123.

When connected to an AC power source, the ICCB 100 starts operation and is connected to the on-board charger 122 when the connector 102 is connected to the inlet 121. Then, the battery 123 is charged by the on-board charger 122 that receives electric power from the ICCB 100.

Figure 2:
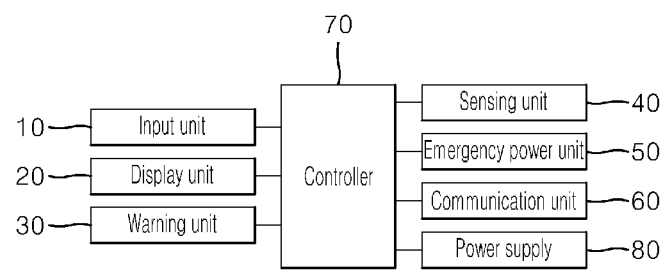
FIG. 2 is a block diagram of the in-cable control box for charging an electric vehicle according to the embodiment of the present invention.

Referring to FIG. 2, the ICCB 100 according to the embodiment of the invention includes an input unit 10, a display unit 20, a warning unit 30, a sensing unit 40, an emergency power unit 50, a communication unit 60, a controller 70, and a power supply 80.

The input unit 10 receives selection of a charging mode and settings according to the charging mode and transmits the selection of the charging mode and the settings to the controller 70. The charging mode may include at least one of a starting mode, a terminating mode, and a scheduled mode. The starting mode is a mode for directly starting charging, the terminating mode is a mode for directly terminating charging, and the scheduled mode is a mode for starting or terminating charging at a time point scheduled by a user. Further, the settings according to the charging mode may include at least one of a charging start time, a charging termination time, a charging amount, and a maximum allowable current.

When receiving the settings according to the maximum allowable current through the input unit 10, the controller 70 may control the power supply 80 to limit a maximum current level supplied to the on-board charger 122 according to the settings.

The power supply 80 supplies electric power to the on-board charger 122 under control of the controller 70. At this time, the power may be supplied by a power relay.

The display unit 20 displays a charging state under control of the controller 70. The charging state may include at least one of power connection, vehicle connection, charging schedule, charging start, charging, charging termination, and failure.

The controller 70 may receive a charging amount of the battery 123 from the on-board charger 122, and may display the charging amount through the display unit 20. The charging amount may be displayed in the form of a percentage (e.g., 80%) or an LED bar. Additionally, the controller 70 may calculate a charging fee for charging quantity of electricity, and may control the display unit 20 to display the charging fee.

The warning unit 30 outputs a warning sound corresponding to change in the charging state under control of the controller 70. The warning sounds may be different corresponding to the change in the charging state and may include at least one of sound effects or audio guides.

When the starting mode is input through the input unit 10, the controller 70 checks the state of the on-board charger 122 and determines whether charging is possible. The state of the on-board charger 122 is transmitted to the controller 70. To this end, the ICCB 100 may include a control signal communication unit (not shown) for communicating with the on-board charger 122. Here, communication between the controller 70 and the on-board charger 122 may be based on a controller area network (CAN) method or a power line communication (PLC) method.

According to the states of the on-board charger 122, the controller 70 may determine whether the connector 102 is connected to the inlet 121, whether charging is possible, whether charging is impossible as charging is completed or as there is failure in the on-board charger 122, and so on.

If it is determined that charging is possible, the controller 70 supplies electric power to the on-board charger 122 through the power supply 80.

When charging starts, the controller 70 controls the display unit 20 to display charging start and the warning unit 30 to output a warning sound corresponding to charging start. Then, the controller 70 controls the display unit 20 to display the state of charging.

During charging, if the terminating mode is input through the input unit 10 or if the controller 70 checks the state of the on-board charger 122 and determines that charging is impossible, the controller 70 cuts off the electric power supplied from the power supply 80 to the on-board charger 122. Then, the controller 70 controls the display unit 20 to display charging termination, and controls the warning unit 30 to output a warning sound corresponding to charging termination.

The sensing unit 40 senses failure of the in-cable control box. The failure includes overcurrent, current leakage, relay fusion, and similar errors in supply of electric power. In addition, the failure includes other cases where charging is impossible. Here, at least one sensing unit 40 may be provided corresponding to elements required to be sensed. The sensing unit 40 may sense the failure periodically or intermittently under control of the controller 70. The controller 70 may control the sensing unit 40 to sense the failure only when needed.

When failure of the in-cable control box is sensed through the sensing unit 40, the controller 70 cuts off the electric power supplied from the power supply 80 to the on-board charger 122. Then, the controller 70 controls the display unit 20 to display the kind of failure, and controls the warning unit 30 to output a warning sound corresponding to the kind of failure.

When electric power is not supplied due to disconnection of the AC power line or other connection errors, the emergency power unit 50 supplies emergency power for temporarily operating the ICCB 100. When power supply to the ICCB 100 is stopped, the controller 70 controls the emergency power unit 50 to supply electric power to the ICCB and controls the warning unit 30 to output a warning sound corresponding to disconnection of the AC power line 101. The emergency power unit 50 operates only in the case where supply of AC power is stopped after the ICCB 100 is connected to the AC power source and starts operation. To this end, the emergency power unit 50 may include a battery.

The communication unit 60 transmits information about the charging state to a user terminal (not shown) under control of the controller 70, and receives the selection of the charging mode and the settings according to the charging mode from the user terminal. The user terminal may include a portable device, a user cellular phone, and the like, without being limited thereto. Alternatively, the user terminal may include various devices capable of being linked to the ICCB 100. Communication methods between the communication unit 60 and the user terminal may include Bluetooth, Wi-Fi, WCDMA, and the like, without being limited thereto.

When the selection of the charging mode and the settings according to the charging mode are input from the user terminal to the communication unit 60, the controller 70 controls the power supply 80 to supply electric power to the on-board charger 122 according to the charging mode and the settings received from the user terminal rather than existing charging mode and settings.

Figure 3:
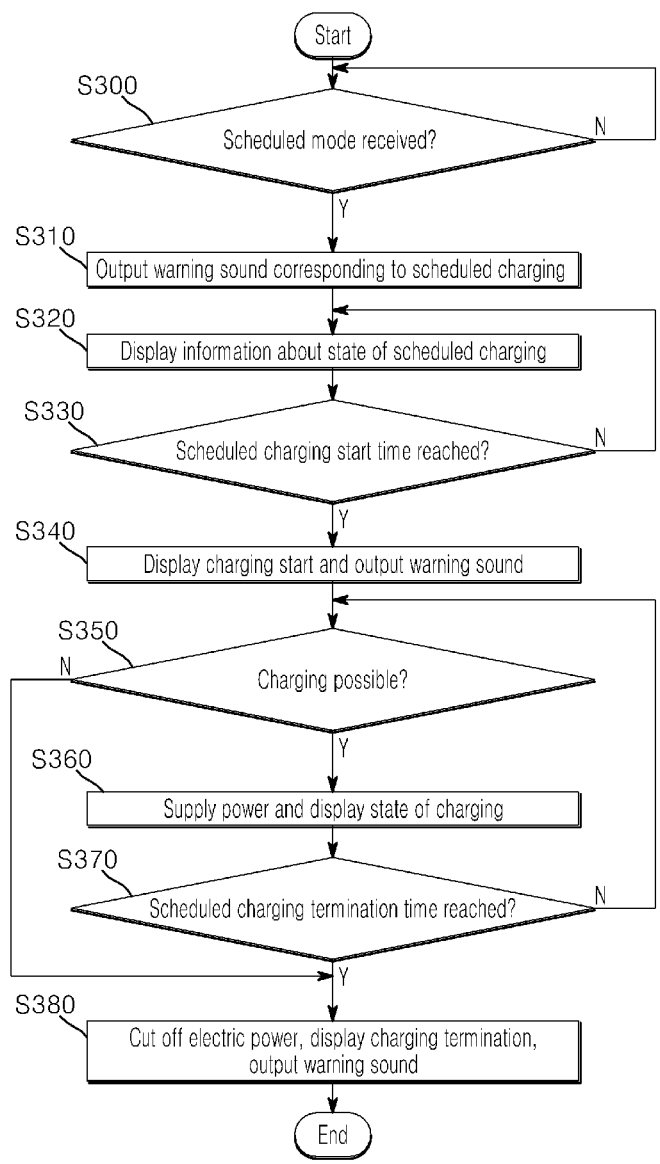
FIG. 3 is a flowchart of a scheduled charging method of an in-cable control box for charging an electric vehicle according to one embodiment of the present invention.

FIG. 3 is a flowchart of a scheduled charging method of an in-cable control box for charging an electric vehicle according to one embodiment of the present invention.

Referring to FIG. 3, when a scheduled mode is input though the input unit 10 (S300), the controller 70 controls the warning unit 30 to output a warning sound corresponding to the scheduled charging (S310), and controls the display unit 20 to display information about the state of scheduled charging (S320). Here, the displayed information about the state of scheduled charging may include a scheduled charging start time and a remaining time to the scheduled charging start time.

Then, the controller 70 determines whether the scheduled charging start time has been reached (S330).

According to the determination result (S330), if the scheduled charging start time has been reached, the controller 70 controls the display unit 20 to display charging start and controls the warning unit 30 to output a warning sound corresponding to charging start (S340). On the other hand, if the scheduled charging start time has not been reached, the controller 70 returns to operation S320 and maintains displaying the state information about the scheduled charging.

After operation S340, the controller 70 checks the state of the on-board charger 122 and determines whether charging is possible (S350).

According to the determination result (S350), if it is determined that charging is possible, the controller 70 controls the power supply 80 to supply electric power to the on-board charger 122 and controls the display unit 20 to display information about the state of charging (S360). Here, the displayed information about the state of charging may be a remaining time to a scheduled charging termination time.

Then, the controller 70 determines whether the charging termination time has been reached (S370). The charging termination time may be calculated and set by the controller 70 according to a preset charging amount.

According to the determination result (S370), if the charging termination time has not been reached, the controller 70 returns to operation S350 for determining whether charging is possible. On the other hand, if the charging termination time has been reached, the controller 70 cuts off electric power supplied from the power supply 80 to the on-board charger 120, controls the display unit 20 to display charging termination, and controls the warning unit 30 to output a warning sound corresponding to charging termination (S380).

In the in-cable control box for charging an electric vehicle and the scheduled charging method thereof according to the present invention, various user interface (UI) environments are provided to improve user convenience and satisfaction.

As described above, the present invention can inform a driver of detailed information about a charging state through sight, hearing and a user terminal such that the driver can correctly recognize the charging state and quickly cope with a problem with charging. In addition, the present invention allows a driver to charge an electric vehicle with required quantity of electricity at a desired time through a charging scheduling function, whereby the electric vehicle can be charged at midnight when electricity is inexpensive, thereby reducing charging costs for the electric vehicle.

Although some embodiments have been described herein with reference to the accompanying drawings, it should be understood that these embodiments are given by way of illustration only, and that various modifications, variations, and alterations can be made without departing from the spirit and scope of the present invention. Therefore, the scope of the present invention should be limited only by the following claims and equivalents thereof.

What is claimed is:

1. An in-cable control box comprising:
an input unit that receives selection of a charging mode and settings according to the charging mode;
a display unit that displays a charging state;
a warning unit that outputs a warning sound corresponding to change in the charging state;
a power supply that supplies electric power to an on-board charger of an electric vehicle
a controller that regulates electric power from the power supply to the on-board charger according to the charging mode and settings received through the input unit, controls the display unit to display a charging state, and controls the warning unit to output a warning sound corresponding to change in the charging state, and
an emergency power unit for supplying emergency power to the in-cable control box,
wherein the controller controls the emergency power unit to supply electric power to the in-cable control box, and controls the warning unit to output a warning sound when supply of the electric power to the in-cable control box is stopped.

2. The in-cable control box according to claim 1, wherein the controller regulates the electric power supplied from the power supply to the on-board charger according to scheduled settings when a scheduled mode is input through the input unit, and cuts off the electric power supplied from the power supply to the on-board charger when charging of the on-board charger becomes impossible before a termination time according to the scheduled settings is reached.

3. The in-cable control box according to claim 1, further comprising:
a sensing unit for sensing failure of the in-cable control box,
wherein the controller cuts off the electric power supplied from the power supply to the on-board charger, controls the display unit to display the kind of failure, and controls the warning unit to output a warning sound corresponding to the kind of failure, when the sensing unit senses failure of the in-cable control box.

4. The in-cable control box according to claim 1, further comprising:
a communication unit for communicating with a user terminal,
wherein the controller transmits information about the charging state to the user terminal through the communication unit.

5. The in-cable control box according to claim 4, wherein the controller regulates the electric power supplied from the power supply to the on-board charger according to the charging mode and the settings received from the user terminal, when the selection of a charging mode and the settings according to the charging mode are received from the user terminal through the communication unit.

* * * * *